April 29, 1958  R. H. BERGERSON  2,832,634
BALE FORKS
Filed Aug. 1, 1956
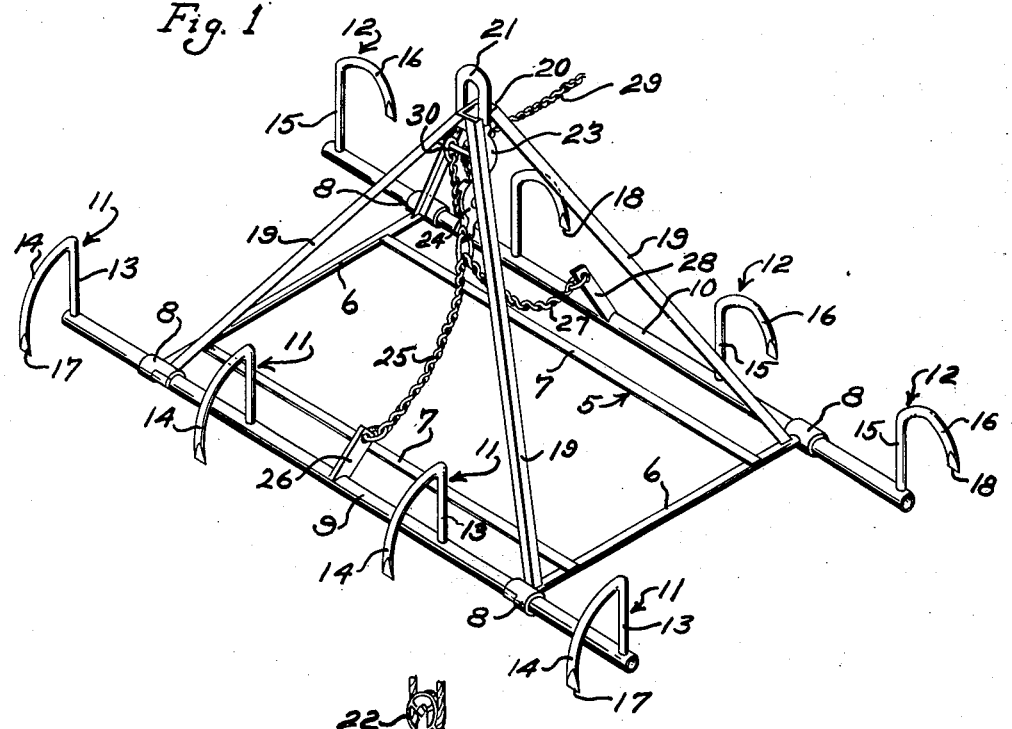
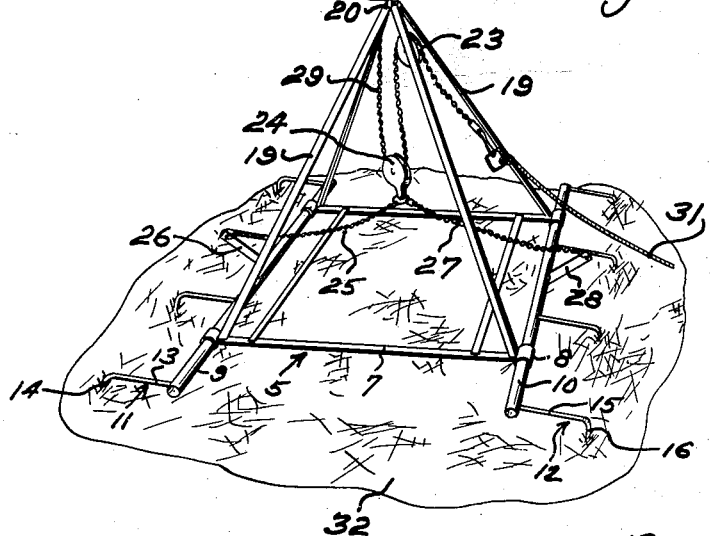
INVENTOR.
Raymond H. Bergerson
BY
Morsell & Morsell
Attorneys

United States Patent Office 2,832,634
Patented Apr. 29, 1958

2,832,634

BALE FORKS

Raymond H. Bergerson, Northfield, Wis.

Application August 1, 1956, Serial No. 601,514

1 Claim. (Cl. 294—109)

This invention relates to improvements in bale forks.

It is a general object of the present invention to provide an improved bale fork which is so constructed that it may be lowered onto the top of a relatively flat assemblage of eight to ten bales of hay to pick up all of said bales simultaneously.

A further object of the invention is to provide a bale fork as above described which has novel tripping mechanism free of springs or dangerous hair-trigger catches whereby the bales are securely held as long as necessary, and quickly and easily released when in discharge position so that the bales may drop in one unit in the same flat position that they were when picked up.

Other objects of the invention are to provide a bale fork which is light in weight but strong, which has foolproof operation, which has a rigid suspension frame, and which is relatively simple and inexpensive to manufacture.

With the above and other objects in view, the invention consists of the improved bale fork, and all of its parts and combinations, as set forth in the claim, and all equivalents thereof.

In the accompanying drawings, illustrating one complete embodiment of the preferred form of the invention, in which the same reference numerals designate the same parts in all the views:

Fig. 1 is a perspective view of the bale fork showing the tines in releasing position; and Fig. 2 is another perspective view showing the tines in engagement with an assemblage of hay bales.

Referring more particularly to the drawing, the numeral 5 designates a normally horizontally disposed rectangular frame which includes spaced rods 6 and spaced connecting members 7 at right angles thereto. The ends of the rods 6 project beyond the members 7 and have sleeves or bearings 8 rigidly connected thereto with the openings in the bearings extending parallel to the direction of extent of the connecting members 7. Rockably mounted in the bearings 8 are rock shafts 9 and 10. A plurality of tines 11 are connected to the rock shaft 9 in longitudinally spaced relationship thereon. A plurality of tines 12 are connected to the rock shaft 10 in longitudinally spaced relationship thereon. The tines 11 include stem portions 13 having inner ends rigidly connected to the shaft 9 and projecting at substantially right angles therefrom. Connected to and preferably integral with the outer ends of each of the stems 13 are curved bale engaging portions 14. Each portion 14 meets its stems 13 at an acute angle and curves outwardly and downwardly therefrom when the stems are in the upwardly projected releasing position of Fig. 1.

The tines 12 on the rock shaft 10 also include stems 15 like the stems 13 of the tines 11 and include curved bale engaging portions 16 like the portions 14 of the tines 11, but projecting in the opposite direction. It is important to note that when the device is in releasing condition the lower ends 17 and 18 of the tines are substantially in the same horizontal plane as the frame 5 so that there is nothing projecting below this plane. Thus the bale fork, when in the condition of Fig. 1, may be readily lowered on top of a flat assemblage of hay bales to rest in flat condition thereon. Thereafter the tines may be swung into the hay engaging position of Fig. 2 where they, of course, project downwardly below the plane of the frame and also in a curved direction inwardly to afford a firm engagement with the hay.

Rigid elongated suspension members 19 have their lower ends connected near the ends of the frame members 6 and project angularly upwardly in converging relationship to an apex 20, where they are secured together. This affords a very strong suspension frame and a strong support for the novel tripping mechanism to be hereinafter described. At the apex 20 there may be an eye 21 to which lifting mechanism 22 from an overhead carrier (not shown) may be attached. Suspended from the apex 20 is a block 23 including a sheave. Another block 24 including a sheave is below the block 23. The latter is connected by one flexible member 25, preferably a chain, to the outer end of a lever 26, the inner end of the lever being rigidly connected to the rock shaft 9. The block 24 is also connected to the outer end of a lever 28 by another flexible member such as a chain 27. The latter projects from the rock shaft 10. A flexible tripping member, preferably a chain 29, has its upper end dead-ended to the suspension frame, preferably near the apex thereof, as at 30. The chain passes beneath the sheave of the block 24 and then up and over the sheave of the block 23. The outer end of the chain 29 forms a manually operable end and is adapted to have a cable 31 connected thereto so that the tripping may be performed from a remote point.

Operation

In use the overhead carrier (not shown) to which the mechanism 22 is attached may be moved to a position over the bales to be picked up. Before the device is lowered onto the bales, the tripping mechanism is held in the condition of Fig. 1 by exerting a pull on the rope 31. This acts to raise the block 24, which in turn pulls on the chains 25 and 27 to pull the levers 26 and 28 from the angularly outwardly projecting position of Fig. 2 to the angularly inwardly and upwardly projecting position of Fig. 1. This causes rocking of the shafts 9 and 10 simultaneously to bring the tines to the position of Fig. 1, where the lower ends 17 and 18 are substantially in the plane of the frame 5.

Thereafter the device may be lowered onto a flat assemblage 32 of eight or ten bales of hay. Due to the fact that there are no parts projecting below the plane of the frame 5, the frame may be lowered until it is flat on top of the assemblage of bales and in snug position thereon. Thereafter the shafts 9 and 10 may be manually rocked to move the tines 11 and 12 from the position of Fig. 1 to the position of Fig. 2. During such movement the block 24 moves from the elevated position of Fig. 1 to the lowered position of Fig. 2 to release the pull on the levers 26 and 28.

As soon as the tines are properly engaged with the bales as in Fig. 2, the device may be elevated in the usual manner.

After the load is in position over a discharge point a pull on the rope 31 will move all of the tines 11 and 12 from the position of Fig. 2 to the position of Fig. 1 to simultaneously release all of the bales so that they will drop in one unit in the same flat position that they were when picked up.

Due to the special leverage provided in the tripping arrangement, it requires little effort to swing the tines to releasing position, and said operation is foolproof. Furthermore, by eliminating springs or trigger catches for holding the tines in engagement, there is no danger of premature release.

Various changes and modifications may be made without departing from the spirit of the invention, and all of such changes are contemplated as may come within the scope of the claim.

What I claim is:

A bale fork comprising a normally horizontal frame adapted to be lowered onto the top of a relatively flat assemblage of juxtaposed bales, a rock shaft journaled along one side of said frame, a rock shaft journaled along the opposite side of said frame, tines rigidly connected to said shafts in longitudinally spaced relationship thereon and projecting outwardly therefrom, a lever rigidly connected to each shaft to project therefrom, rigid elongated suspension members projecting upwardly from the frame to an apex, suspension means at said apex to provide for suspension of the fork from a carrier, and means independent of said suspension means for actuating said levers to rock said shafts and comprising: a first block including a sheave depending from said apex, a second block including a sheave spaced below said first block, flexible members connecting said second block to both of said levers, and a flexible tripping member having one end connected to the frame and passing under the sheave of said second block and over the sheave of said first block and having a manually operable end extending therefrom whereby the shafts may be simultaneously rocked to operate the tines when a pull is exerted on said manually operable end without affecting the connection at said suspension means, said levers being at such an angle with respect to the tines that said pull operates to move the tines to bale releasing position.

References Cited in the file of this patent

UNITED STATES PATENTS

| | | |
|---|---|---|
| 39,641 | Gates | Aug. 25, 1863 |
| 2,049,679 | Whiteman et al. | Aug. 4, 1936 |
| 2,457,181 | Rutledge | Dec. 28, 1948 |
| 2,551,235 | Bates | May 1, 1951 |
| 2,569,760 | Hansen et al. | Oct. 2, 1951 |